US006780111B2

(12) United States Patent
Cannon et al.

(10) Patent No.: US 6,780,111 B2
(45) Date of Patent: Aug. 24, 2004

(54) METHOD, APPARATUS AND SYSTEM FOR PERPETUAL BONUS GAME

(75) Inventors: Lee E. Cannon, Boxeman, MT (US); Don G. DuPerault, Las Vegas, NV (US)

(73) Assignee: IGT, Reno, NV (US)

( * ) Notice: Subject to any disclaimer, the term of this patent is extended or adjusted under 35 U.S.C. 154(b) by 162 days.

(21) Appl. No.: 09/997,856

(22) Filed: Nov. 30, 2001

(65) Prior Publication Data

US 2003/0104860 A1 Jun. 5, 2003

(Under 37 CFR 1.47)

(51) Int. Cl.[7] ........ A63F 13/00
(52) U.S. Cl. ........ 463/25; 436/20; 436/16
(58) Field of Search ........ 463/16, 17, 18, 463/19, 20, 25, 26, 27

(56) References Cited

U.S. PATENT DOCUMENTS

| | | | | | |
|---|---|---|---|---|---|
| 4,837,728 | A | | 6/1989 | Barrie et al. | |
| 5,393,057 | A | * | 2/1995 | Marnell, II | 463/13 |
| 5,564,700 | A | * | 10/1996 | Celona | 463/27 |
| 5,655,961 | A | | 8/1997 | Acres et al. | |
| 5,796,716 | A | | 8/1998 | Smith | |
| 5,855,515 | A | | 1/1999 | Pease et al. | |
| 6,048,269 | A | | 4/2000 | Burns et al. | |
| 6,089,976 | A | | 7/2000 | Schneider et al. | |
| 6,089,978 | A | | 7/2000 | Adams | |
| 6,165,071 | A | | 12/2000 | Weiss | |
| 6,190,255 | B1 | | 2/2001 | Thomas et al. | |
| 6,319,125 | B1 | * | 11/2001 | Acres | 463/25 |
| 6,592,457 | B1 | * | 7/2003 | Frohm et al. | 463/16 |
| 6,599,190 | B2 | * | 7/2003 | Osawa | 463/20 |
| 6,599,193 | B2 | * | 7/2003 | Baerlocher et al. | 463/27 |
| 6,605,001 | B1 | * | 8/2003 | Tarantino | 463/22 |
| 2003/0064779 | A1 | * | 4/2003 | Suda | 463/20 |
| 2003/0069057 | A1 | * | 4/2003 | DeFrees-Parrott | 463/16 |

* cited by examiner

*Primary Examiner*—Jessica Harrison
(74) *Attorney, Agent, or Firm*—Marshall, Gerstein & Borun LLP

(57) ABSTRACT

Methods of playing games and gaming systems and devices useful for playing games. Gaming devices include a first gaming unit for randomly selecting and displaying indicia associated with play of a primary game and for generating a signal relating to play on the first gaming unit. The gaming device also includes a second gaming unit connected to the first gaming unit for conducting an ongoing bonus game and enabling participation by a player in the ongoing bonus game in response to a signal generated by the first gaming unit. The ongoing bonus game may be administered by and communicated from a second gaming unit in the form of a host server to a number of networked gaming devices. Players may enter and exit play of the ongoing bonus game while it is still in progress, participating only in a segment thereof.

8 Claims, 3 Drawing Sheets

METHOD, APPARATUS AND SYSTEM FOR PERPETUAL BONUS GAME

BACKGROUND OF THE INVENTION

Field of the Invention. The present invention is directed to methods of playing games of chance and apparatus and systems for playing an ongoing bonus game wherein a player may enter the ongoing bonus game, participate therein and exit therefrom while the ongoing bonus game is still in process.

State of the Art. Games of chance have been enjoyed by people for thousands of years and have enjoyed widespread popularity in recent times. Many people enjoy playing variations of games that they have not played before. Playing new variations of games adds to the excitement of this recreational activity, particularly when some form of gaming is involved. As used herein, the terms "gaming and gaming devices" are used to indicate that some form of wagering is involved and that players must make wagers of value, whether actual currency or some equivalent of value, e.g., token or credit.

Players involved in games of wagering often enjoy new games or variations of old games with relatively simple rules that can be readily learned by a beginner or casual player. Variations to a game with respect to the method of wagering and the ability to increase winnings attracts more players and is highly desired in the industry. The ability to increase winnings where risk is involved based on the selection of a possible random outcome is also highly desired. There has been an accelerating evolution of gaming devices over the past few decades. At the beginning of this evolution, there were mechanical gaming devices, such as the traditional slot machine. The advent of relatively inexpensive computer processors and associated display devices in the form of electronic gaming devices allowed the introduction of computer-emulated games and a pseudo (video) display of the movement of reels or other elements of a mechanical device as well as the game outcome. The next evolutionary step was the integration of communication capabilities between servers and other computers and electronic gaming devices, allowing the interchange of data and information between electronic gaming devices and an operator such as a casino via a network between computers.

The development of communications between gaming machines and networks allowed for the development of systems allowing the players at those machines to compete for additional prizes while playing the traditional wagering games. Among these are progressive gaming systems, such as those disclosed in U.S. Pat. No. 4,837,728 and U.S. Pat. No. 5,855,515, the disclosures of which are incorporated herein by reference. In a progressive system, a number of gaming machines are linked together and an additional or bonus prize is made available, which increases in value as wagers are placed on the machines and a portion of each wager is allocated into a bonus prize pool. Each coin drop freezes the available bonus amount for that game. When a player wins, the entire amount of the progressive bonus is awarded and the progressive game restarts. While players are attracted to larger progressive bonuses, after an award of the bonus, interest in playing the machines can wane due to the small amount of the available bonus prize.

A current enhancement to the market is the addition of secondary or bonus games to slot machines. These gaming machines allow a player to participate in an additional or "bonus" game and thereby have a chance to earn an additional payout or bonus prize. The bonus game is typically a single event, or a sequential event where progress through the bonus game is determined by the continuation of play on the slot machine. Examples of such bonus games are disclosed in U.S. Pat. No. 6,089,978, U.S. Pat. No. 6,089,976 and U.S. Pat. No. 5,796,716, the disclosures of which are incorporated herein by reference. These bonus games conventionally begin when a selected random event occurs in a primary game on a gaming machine. The bonus game is then activated and begins. At the end of the game, an indicated payout value is awarded as a bonus prize. The bonus games disclosed in these references include a prize wheel that spins, a number of computer generated options that are selected to receive bonuses until an end game signal is reached, or a dexterity- or skill-based video game U.S. Pat. No. 6,190,255, the disclosure of which is incorporated herein by reference, discloses modifications that may be made to a bonus game. A random occurrence in a base game, such as the occurrence of a special symbol combination, causes a computer processor to generate a resource exercisable in the bonus game. For example, a resource can be used to override the end bonus outcome and continue the bonus game to receive a different end outcome.

The networking of computers has also allowed and improved the ability to track the usage of individual gaming machines including the players using such a machine. Player tracking systems allow for the management of large numbers of gaming machines and players simultaneously. Examples of player tracking systems may be found in U.S. Pat. No. 6,165,071, U.S. Pat. No. 6,048,269, and U.S. Pat. No. 5,655,961, the disclosures of which are incorporated herein by reference. Such systems allow players to carry credits from one gaming machine to another, thereby avoiding or at least minimizing the use of coins or tokens, to track the gaming usage of the players for marketing purposes and to allow the players to play for a higher payout upon meeting certain conditions.

It would be particularly desirable to provide opportunities to increase winning payouts and also allow a player the opportunity to participate in a bonus game that is continually ongoing and offers the ability to increase the value of bonus awards among networked machines. For example, offering a player the opportunity to participate in an ongoing bonus game where the value of available bonus awards would increase from the actions of multiple gaming machines and thereby increase his or her potential winnings is also desirable. Allowing the player to reenter and continue participation in the ongoing or perpetual bonus game is also desirable.

BRIEF SUMMARY OF THE INVENTION

Various embodiments of the present invention comprise gaming devices including a first gaming unit for randomly selecting and displaying a set of indicia and apparatus for generating a signal corresponding to some signal from the first gaming unit, for example, input by a player, certain combinations of randomly generated and displayed indicia in play of a primary game thereon, or some other event associated with primary game play on the first gaming unit. The gaming device also includes a second gaming unit for displaying an ongoing bonus game where the second gaming unit is in communication with the first gaming unit and enables participation by the player in response to a signal generated by the first gaming unit.

The ongoing bonus game may be communicated from a host server functioning as a bonus event computer over a network to a number of gaming units configured for play of a primary game and, in combination with the host server, enabling participation in the ongoing bonus game.

The present invention also comprises an ongoing bonus game wherein a player may enter the ongoing bonus game while it is in progress, participate and then exit the bonus game while it is still in progress. Reentry into the same, ongoing bonus game from time to time so as to enable intermittent play thereof is also encompassed by the present invention.

While the present invention encompasses a so-called "perpetual" ongoing bonus game, it is also contemplated that a bonus game ongoing for an extended period of time but which is not literally "perpetual" is also encompassed by the present invention. For example, an ongoing bonus game which extends for a sufficient period of time for play of a plurality of game segments or portions thereof to some conclusion possibly resulting in, or progressing toward, a bonus prize award is contemplated as within the scope of the present invention. Specifically and without limitation, ongoing bonus games which may extend over periods of at least minutes and including periods of hours, days, weeks, months or years are contemplated and encompassed by the present invention.

As used herein, the term "game of chance" includes and encompasses not only games having a random or arbitrary outcome, but also such games which also invite or require some player input to the game having at least a potential for affecting a game outcome. Such player input is generally termed "skill" whether or not such input is in actuality beneficial in terms of game outcome.

DETAILED DESCRIPTION OF THE ILLUSTRATED EMBODIMENTS

The following describes some exemplary embodiments of the present invention. It will be appreciated that the examples used herein are illustrative only, and the invention include methods, systems and devices for gaming that include or enable play of a perpetually ongoing bonus game.

Figure 1:
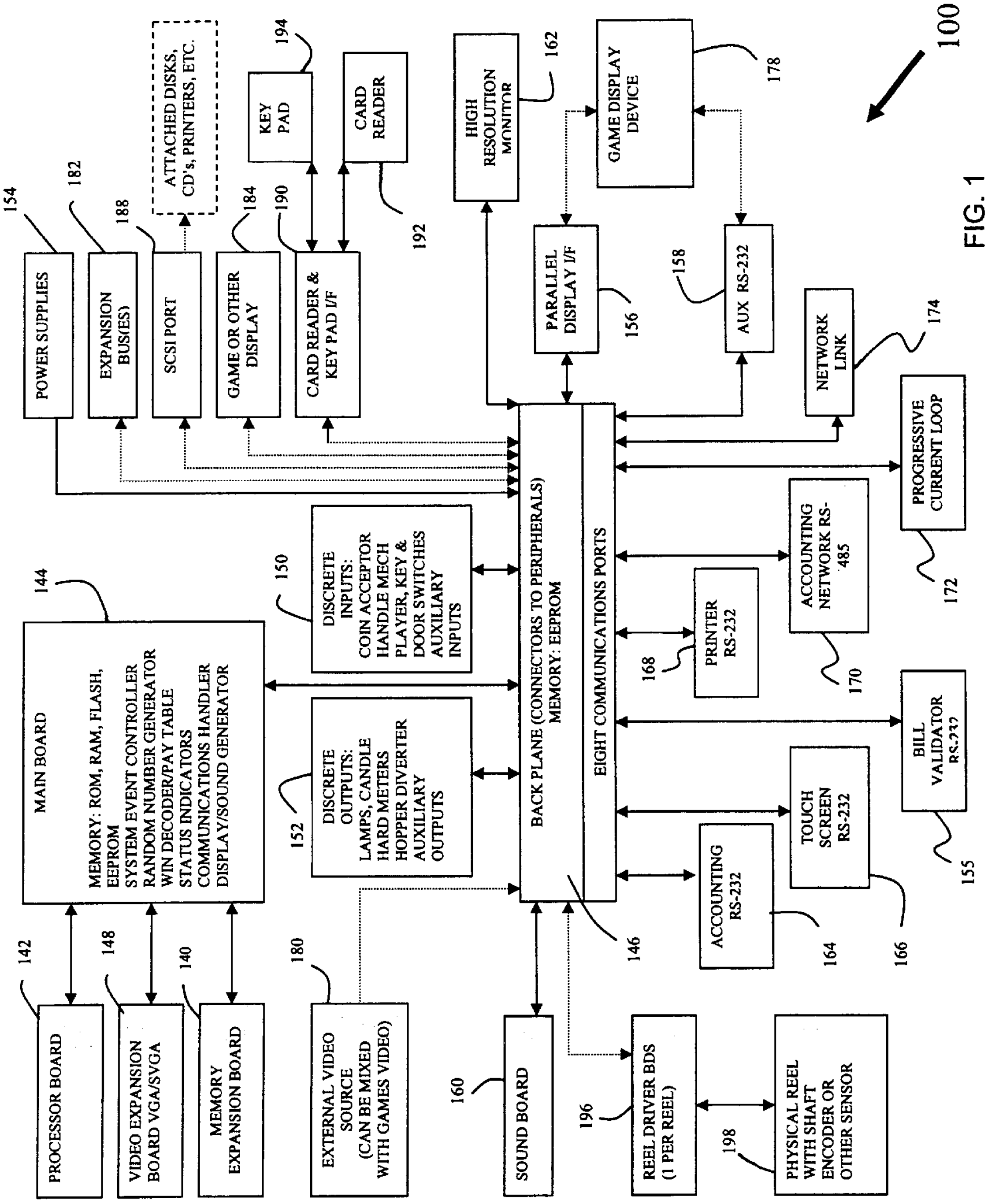
FIG. 1 is a schematic representation of one possible embodiment of a gaming machine that may be used in accordance with the principles of the present invention.

FIG. 1 illustrates an exemplary gaming machine, which may also be termed a gaming device or gaming unit, for use in implementing the bonus game of the present invention. Shown is gaming machine 100, which includes a main board 144 and a back plane 146 integrally or separately formed. Memory expansion board 140 as well as processor board 142 including a graphics system processor and video expansion board VGA/SVGA 148 are operably coupled to the main board 144. The main board 144 preferably includes memory in the form of ROM, RAM, flash memory and EEPROM (electrically erasable programmable read only memory). In addition, the main board 144 includes a system event controller, a random number generator, a win decoder/pay table, status indicators, a communications handler and a display/sound generator.

The main board 144 is operably coupled to the back plane 146, which may include additional memory, such as in the form of an EEPROM, and connectors to connect to peripherals. Furthermore, the back plane 146 provides a plurality of communication ports for communicating with external peripherals. The back plane 146 provides the coupling between discrete inputs 150 and the processor board 142 and main board 144. Typical examples of elements which provide discrete inputs are coin acceptors, game buttons, mechanical hand levers, key and door switches and other auxiliary inputs. Furthermore, the back plane 146 provides the coupling between discrete outputs 152 and the processor board 142 and main board 144. Typically, elements that provide discrete outputs are in the form of lamps, hard meters, hoppers, diverters and other auxiliary outputs.

The back plane 146 also provides connectors for at least one power supply 154 for supplying power for the processor board 142 and a parallel display interface "PDI" 156 and a serial interface 158 operably coupled to game display device 178. In addition, the back plane 146 also provides connectors for a sound board 160 and a high-resolution monitor 162 Furthermore, the back plane 146 includes communication ports for operably coupling and communicating with an accounting network 164, a touch screen 166 (which may also serve as a game display device), a bill validator 155 incorporated in a currency (bill) acceptor, a printer 168, an accounting network 170, a progressive current loop 172 and a network link 174

The back plane 146 optionally includes connectors for external video sources 180, expansion buses 182, game or other displays 184, an SCSI port 188 and an interface 190 for at least one card reader 192 (debit/credit, player card, etc.) and key pad 194. The back plane 146 also preferably includes means for coupling a plurality of reel driver boards 196 (one per reel) which drive physical game reels 198 with a shaft encoder or other sensor means to the processor board 142 and main board 144. Of course, the reels may be similarly implemented electronically by display as video images, technology for such an approach being well known and widely employed in the art. In such an instance, reel driver boards 196 and physical game reels 198 with associated hardware are eliminated and the game outcome generated by the random number generator on main board 144 is directly displayed on a high-resolution monitor 162 and, optionally, on a separate game display device 178, as known in the art. Other gaming machine configurations for play of different wagering games such as video poker games, video blackjack games, video Keno, video bingo or any other suitable primary games are equally well known in the art. It will also be understood and appreciated by those of ordinary skill in the art that selected components of gaming device 100 may be duplicated for play of a primary game linked to a bonus game or event in accordance with the present invention. Accordingly, while it is contemplated that the bonus game of the present invention may be implemented by a bonus event computer networked to a gaming device 100 for individual participation or team play, it is also contemplated that the bonus game may be configured for standalone play as a "top box" or second gaming unit mounted to a first gaming unit configured for play of a primary or base game.

Gaming machine 100 may be used to play the primary game that activates the bonus game of the present invention and as a terminal for play of the bonus game. The gaming machine 100 may be configured as a reel-type gaming machine, a video gaming machine which simulates reels or enables play of a card game, or any other type of mechanical or electronic gaming device known in the art for play of the primary game. In one exemplary embodiment, the gaming machine 100 is configured with a five-reel, multiple pay line spinning reel game as the primary game.

Figure 2:
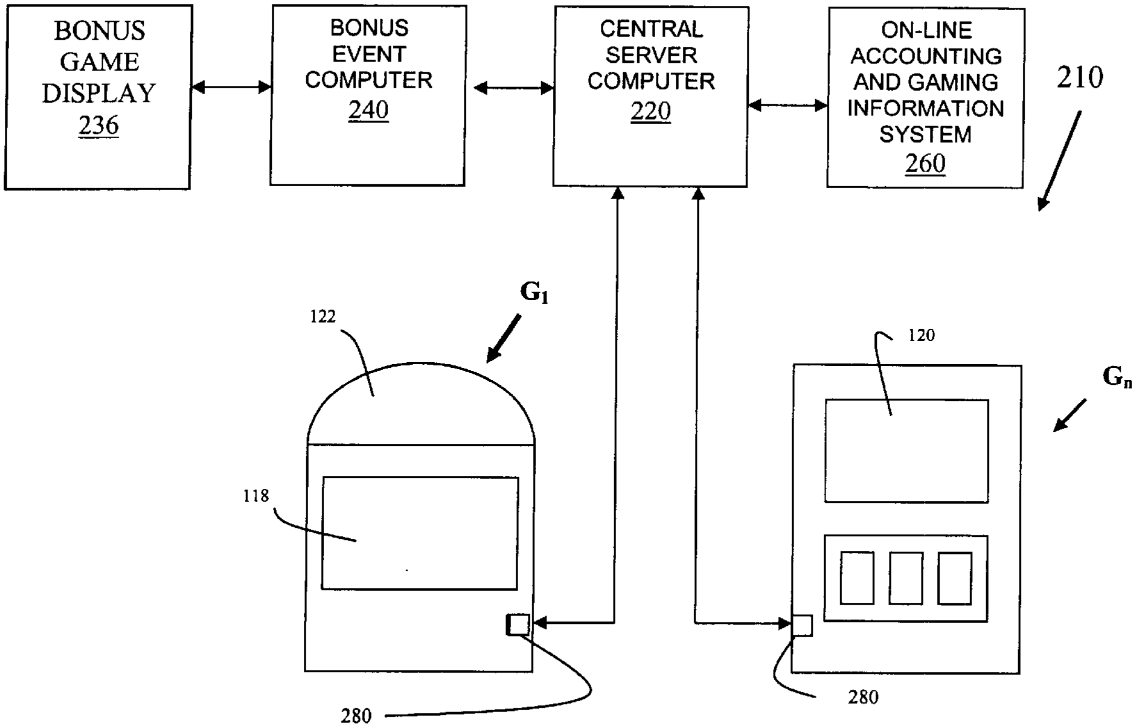
FIG. 2 is a representation of an ongoing bonus game system that may be utilized to implement embodiments of the present invention.

In one embodiment of the present invention, multiple gaming machines 100 located at a particular casino site comprise a bank or other plurality 214 of gaming machines $G_1, G_2 \ldots G_n$ which may be configured, by way of example only, as gaming machines 100. In implementation of the present invention, the gaming machines $G_1, G_2 \ldots G_n$ offering play of the bonus game of the present invention may be deployed, as schematically depicted in FIG. 2, in a gaming network 210 including a central server computer 220 operably coupled to a plurality 214 of gaming machines $G_1, G_2 \ldots G_n$ which may include both electronic and reel type game machines. It is notable that, unless the gaming network 210 is configured for progressive play, a variety of different makes of gaming machines $G_1, G_2 \ldots G_n$ offering widely different games may be incorporated in gaming network 210, since the bonus event operates independently of the primary game on each gaming machine. The central server computer 220 automatically interacts with a plurality of gaming machines $G_1, G_2 \ldots G_n$ to activate a bonus event.

More specifically, and again referring to FIGS. 1 and 2, the gaming network 210 includes a central server computer 220, a bonus event computer 240 and a plurality of gaming machines $G_1, G_2 \ldots G_n$. The functions of central server computer 220 and bonus event computer 240 may be performed by a single computer. Each gaming machine $G_1, G_2 \ldots G_n$ includes a controller assembly 280 operably coupled to the central server computer 220. Each controller assembly 280 is comprised of a controller unit designed to facilitate transmission of signals from its associated individual gaming machine $G_1, G_2 \ldots G_n$ to central server computer 220, which monitors networked gaming machines $G_1, G_2 \ldots G_n$. In addition, the controller assembly 280 includes a network interface board fitted with appropriate electronics for each specific make and model of each individual gaming machine $G_1, G_2 \ldots G_n$.

Referring to FIG. 2, in electronic video games, the central server computer 220 is operably coupled to at least one video game display element 118 as shown at the left-hand side of FIG. 2 and sequesters a portion of the video game display element 118 for displaying video attract sequences to attract potential players. Video game display element 118 may be used for display of both the primary and bonus games. Where the gaming network 210 includes reel-type game machines $G_1, G_2 \ldots G_n$, as shown at the right-hand side of FIG. 2, the central server computer 220 may be operably coupled to at least one active display element 120 so that potential players receive a clear indication of attract sequences and the active display element may be used as a video display for the bonus game. As shown at the left-hand side of FIG. 2, the gaming machines $G_1, G_2 \ldots G_n$ may also be provided with a second video display 122 as an alternative to sequestering a portion of the video game display element 118 for displaying video attract sequences and the bonus game. In addition, the central server computer 220 may include sound-generating hardware and software for producing attractive sounds orchestrated with the video attract sequences at each of gaming machines $G_1, G_2 \ldots G_n$ if such is not already incorporated therein. The games support input and output between the player and the game for such devices as heads up display, joystick, keyboard, mouse and data glove via interface modules connected through the expansion bus or buses 182 and SCSI port 188.

The attractive multimedia video displays and dynamic sounds may be provided by the central server computer 220 by using multimedia extensions to allow gaming machines $G_1, G_2 \ldots G_n$ to display full-motion video animation with sound to attract players to the machines. During idle periods, the gaming machines $G_1, G_2 \ldots G_n$ preferably display a sequence of attraction messages in sight and sound. The videos may also be used to market specific areas of the casino and may be customized to any informational needs.

Furthermore, the gaming network 210 includes bonus event computer 240 operably coupled to the central server computer 220 for scheduling bonus parameters such as the type of bonus game, pay tables and players. The functions of central server computer 220 and bonus event computer 240 may be combined in a single computer. The bonus game may be conducted solely on the bonus event computer 240 and visible manifestations of the bonus game including the outcome thereof displayed as video images on one or more bonus game displays 236 as further discussed below. Bonus event computer 240 may be employed to initiate the bonus game on bonus game apparatus 242 and to receive communications therefrom indicative of the course of the bonus game and its outcome for determination of winners and losers and issuance of bonus awards resulting from winning wagers. Preferably, the gaming network 210 further includes a real-time or on-line accounting and gaming information system 260 operably coupled to the central server computer 220. The accounting and gaming information system 260 includes a player database for storing player profiles, a player tracking module for tracking players and a pit, cage and credit system for providing automated casino transactions.

As previously implied, a bank of gaming machines $G_1, G_2 \ldots G_n$ may be networked together in a progressive configuration, as known in the art, wherein a portion of each wager to initiate a primary game may be allocated to bonus event awards. In addition, and referring to FIG. 3, a host site computer 320 is coupled to a plurality of the central server computers 220 at a variety of remote gaming sites $C_1, C_2 \ldots C_n$ for providing a multi-site linked automated bonus gaming system 310 which, optionally, may be configured for progressive play.

Preferably, the host site computer 320 will be maintained for the overall operation and control of the system 310. The host site computer 320 includes a computer network 322 and a communication link 324 provided with a high-speed, secure modem link for each individual casino site $C_1, C_2 \ldots C_n$.

Each casino site $C_1, C_2 \ldots C_n$ includes the central server computer 220 provided with a network controller 230 which includes a high-speed modem operably coupled thereto. Bi-directional communication between the host site computer 320 and each casino site central server 220 is accomplished by the set of modems transferring data over communication link 324.

A network controller 230, a bank controller 232 and a communication link 234 are interposed between each central server computer 220 and the plurality of attached gaming machines $G_1, G_2 \ldots G_n$ at each casino site $C_1, C_2 \ldots C_n$. In addition, the network controller 230, the bank controller 232 and the communication link 234 may optionally be interposed between each central server computer 220 and at least one separate bonus game display 236 at each casino site $C_1, C_2 \ldots C_n$. However, the system 310 may include hardware and software to loop back data for in-machine meter displays to communicate with bonus event award insert areas on gaming machines $G_1, G_2 \ldots G_n$.

As illustrated in FIG. 2 and by way of exemplary implementation of the present invention, the bank 214 of gaming machines $G_1$, $G_2$ . . . $G_n$ is connected or linked with at least one bonus game display 236 to form a competitive bonus gaming network 210. In one preferred embodiment further described below, the bank of gaming machines 214 comprises at least fifty gaming machines $G_1$, $G_2$ . . . $G_n$, where "n" equals at least fifty, connected or linked with the bonus game display 236 through communication link 234. The bonus game of the present invention is displayed on the at least one bonus game display 236. The multiple gaming machines are represented in FIG. 2 as $G_1$ through $G_n$, where $G_1$ is depicted as an electronic slot machine and $G_n$ is depicted as a reel type slot machine. Although only at least fifty gaming machines are networked in the example illustrated in FIG. 2, it will be readily apparent to one of ordinary skill in the art that any number of gaming machines $G_1$, $G_2$ . . . $G_n$ may be used in the present invention.

Bonus game displays 236 employed in implementation of the present invention may be configured as a relatively large liquid crystal display ("LCD") screen or a plurality of such screens. The screen is relatively large in comparison to the high-resolution monitor 162 or other game display device 178 of the gaming machine 100. The bonus game display or displays 236 may be positioned in an area above the gaming machines $G_1$, $G_2$ . . . $G_n$ so that its screen(s) is/are visible to all players at the bank 214 of gaming machines $G_1$, $G_2$ . . . $G_n$. Bonus game display 236 may comprise other types of display screens known in the art, including cathode ray tube (CRT) screens, plasma display screens, and/or screens based on light-emitting diode (LED) technology. Bonus game display 236 may be a display screen configured for multiple uses and/or concurrent display of other casino-sponsored information.

Gaming machines $G_1$, $G_2$ . . . $G_n$ may be connected to bonus game display 236 through communication link 234. Communication link 234 may be any of a variety of communication links known in the art, including, but not limited to: twisted-pair wire, coaxial cable, fiber optic, Ethernet, token ring, bus line, Fibre Channel, ATM, standard serial connections, LAN, WAN, Intranet, Internet, radio waves, or other wireless connections.

The player of a primary game at one of gaming machine $G_1$, $G_2$ . . . $G_n$ wins entry into the bonus game by achieving one or more specific outcomes or by meeting other selected criteria associated with play of the primary or base game. These specific outcomes activate the bonus game. Different specific outcomes may activate various features of the bonus game.

In some embodiments, the ongoing bonus gaming network 210 includes a bonus computer 240 operatively coupled to the central server 220 for operating the ongoing bonus game. The bonus computer 240 may be operatively coupled to a bonus game display 236, which may be a large display for displaying the ongoing bonus game. Alternatively, embodiments that include a multiple network system as illustrated in drawing FIG. 3 may continuously operate on and be administered by the host site computer system 320, allowing the same ongoing bonus game to be accessed at multiple casinos, as discussed further below. In other embodiments a continuously ongoing bonus game may operate on a single gaming machine $G_1$, $G_2$ . . . $G_n$.

Figure 3:
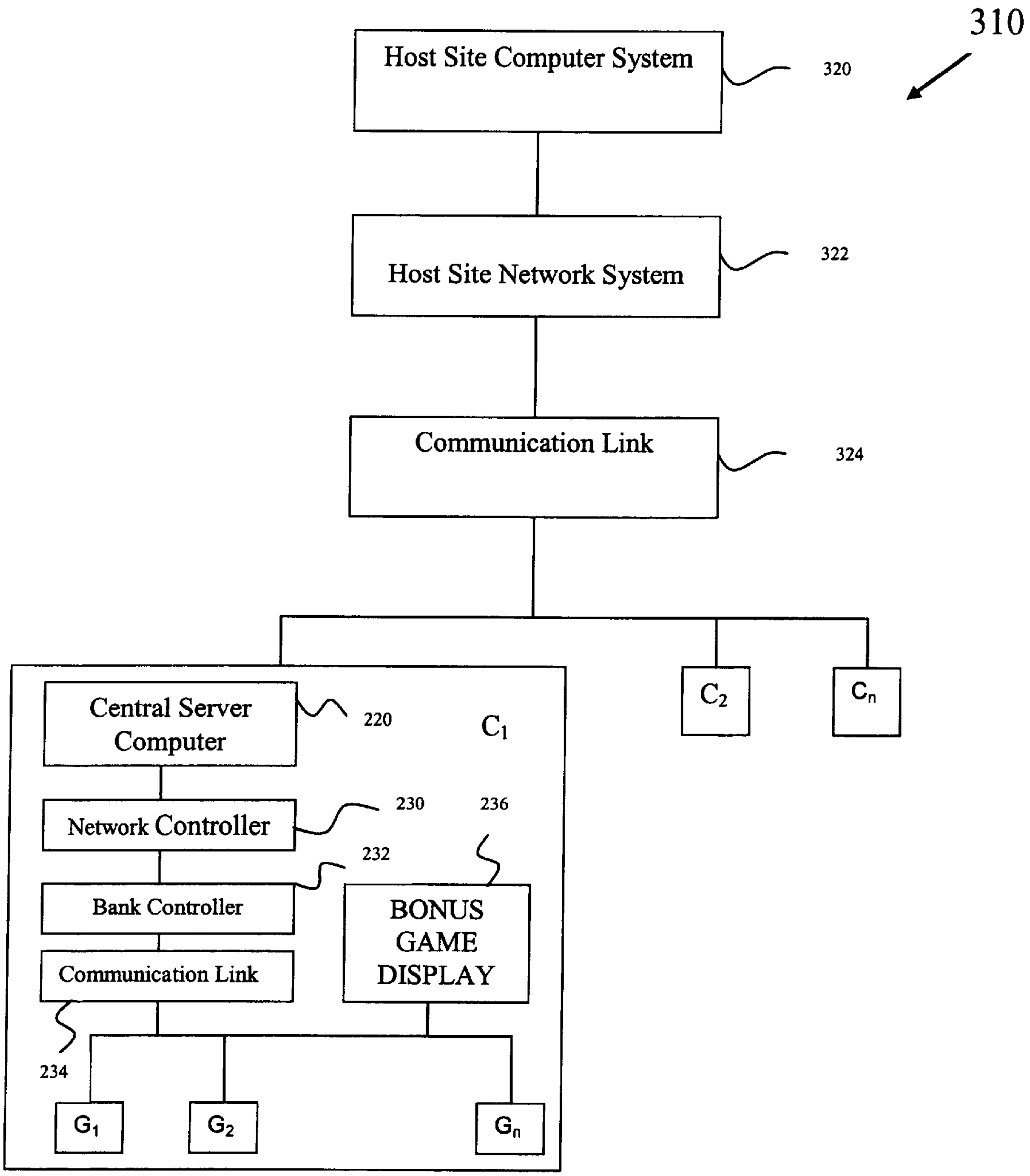
FIG. 3 is a multi-site ongoing bonus game system that may be utilized to implement embodiments of the present invention.

Referring to drawing FIG. 3, the cooperative and competitive bonus gaming system includes a host site computer 320 operatively coupled to the plurality of central server computers 220 at a variety of remote gaming or casino sites $C_1$, $C_2$ . . . $C_n$ for providing a multi-site ongoing bonus gaming system 310. It is preferred that in such embodiments a single ongoing bonus game operates on the host site computer 320, and is accessible therefrom the gaming machines $G_1$, $G_2$ . . . $G_n$ over the network connections described herein. It will be appreciated that it is within the scope of the present invention to operate a number of different ongoing bonus games on the host site computer 320, or to operate a number of games on the central server computers 220 or gaming machines $G_1$, $G_2$ . . . $G_n$ and merely transmit only the data necessary to allow identical or equivalent games to be operated simultaneously on such devices.

In order to more fully appreciate the present invention, several exemplary embodiments of ongoing bonus games, gaming machines and gaming systems will now be discussed in connection with the embodiments of drawing FIGS. 1, 2 and 3. It will be appreciated that the exemplary embodiments are illustrative only and that no limitation of the invention is to be implied by their use. It will be further appreciated that the principles and methods of the present invention may be practiced with other embodiments of gaming machines and gaming systems or otherwise as known now, or in the future, to those skilled in the art and all such embodiments and methods are within the scope of the present invention.

The ongoing bonus game of the present invention is a continuous game in which a player may participate at any point. Players may enter and leave the ongoing bonus game at any point upon the occurrence of a predetermined event at a gaming machine $G_1$, $G_2$ . . . $G_n$ upon which they are playing. Unlike a traditional bonus game, the ongoing bonus game does not terminate due to a player bonus win or other termination of participation in the game, but progresses thereafter. Similarly, it is contemplated that the ongoing bonus game will already be in progress when a player enters to participate therein. At times when a player is not participating in the bonus game from a gaming machine $G_1$, $G_2$ . . . $G_n$, it is preferred that the ongoing bonus game continue to be displayed upon a display 118 or 120 of each gaming machine $G_1$, $G_2$ . . . $G_n$.

A predetermined activity at a gaming machine $G_1$, $G_2$ . . . $G_n$ qualifies a player to participate in the ongoing bonus game, allowing the player to participate in the ongoing bonus game and potentially obtain a bonus prize award. The predetermined activity may be any of a number of occurrences on a gaming machine $G_1$, $G_2$ . . . $G_n$. For example, where a gaming machine $G_1$, $G_2$ . . . $G_n$ offers a spinning reel base or primary game, the random occurrence of a certain number of one or more characters or symbols at a pay line from a spin of the reels may be a qualifying event, as may be certain combinations of characters or symbols. With multiple pay line reel machines, these numbers or combinations of characters or symbols may be required to occur at a specific pay line or qualification may be permitted by the occurrence thereof at any pay line. Alternatively, the placement of a wager of a certain amount on a gaming machine $G_1$, $G_2$ . . . $G_n$, the placement of a selected number of wagers, or the time spent playing a gaming machine $G_1$, $G_2$ . . . $G_n$ may be the predetermined activity. For other types of gaming machines $G_1$, $G_2$ . . . $G_n$, the predetermined activity may be any activity that can occur on that machine, but it is preferred currently that the predetermined activity be associated with a randomly determined outcome of a base or primary game at a gaming machine $G_1$, $G_2$ . . . $G_n$. The base or primary game on each of gaming machines $G_1$, $G_2$ . . . $G_n$ may be, for example, a multi-line, five-reel spinning reel game, either electromechanical with actual moving reels or electronic with simulated reels and movement thereof, the base or primary game awarding prizes when specified numbers, types and configurations of symbols, characters or indicia, also termed "elements," occur on a winning pay line or are otherwise visibly displayed in a winning pattern or arrangement. Alternatively, the primary or base game may comprise any other reel-type game, card game, or other game of chance susceptible to representation in an electronic or electromechanical form. It will be appreciated that the predetermined activity may be selected to occur at any desired percentage of the outcomes, or be otherwise linked to play, of a base game.

The ongoing bonus game will operate substantially continuously, over an extended period of time, but for downtime of the gaming system on which it operates or for modifications to game parameters. Preferably, the ongoing bonus game will be continuously displayed on a display 118, 120 or 236, allowing it to also serve as an attract sequence, to attract players to the gaming machines G. While the bonus prizes awarded in the ongoing bonus game may be fixed, it is preferred that the prizes adjust and reflect events occurring in the base games on the gaming machines $G_1$, $G_2$ . . . $G_n$. This may be accomplished by providing an increase in the prizes in response to specific events occurring on the gaming machines $G_1$, $G_2$ . . . $G_n$. For example, the occurrence of a selected random event in response to a wager on a gaming machine $G_1$, $G_2$ . . . $G_n$ may provide a corresponding increase in the available bonus prizes. In a multi-site system, like that depicted in drawing FIG. 3, the increase may be introduced by the individual casino site $C_1$, $C_2$ . . . $C_n$ in which that selected random event occurs. In such embodiments, it is preferred that a fixed amount be provided as initial bonus prizes when the game is started. It will be appreciated that the bonus prize values may be funded by the gaming machines $G_1$, $G_2$ . . . $G_n$ or by a casino site $C_1$, $C_2$ . . . $C_n$ providing an increase in the value. Such funding may be tracked and apportioned by the on-line accounting and gaming information system 260 or otherwise as known to those skilled in the art.

The ongoing bonus game may be any game, including a video game, that can be continuously ongoing and award prizes to participants, and all such games are within the scope of the present invention. Some examples of suitable ongoing bonus games are selection games, in which a player selects an option out of a number of options and is awarded a prize associated with that option. Another potential ongoing bonus game is a collection game, where the player collects an "object," such as a computer-generated icon in a video game, and is awarded a prize associated with that object. An additional suitable ongoing bonus game is a role-playing game. In an exemplary role-playing game, a player enters the game as a character, preferably selected among a plurality of possible characters, to perform tasks within the game. Many such role-playing games are known to those of ordinary skill in the art. An ongoing bonus gaming system such as those described herein, may be enabled to uniquely identify players, as for example through assigned player identification or "tracking" cards that may be inserted into a card reader 192, an identification code the player inputs into a gaming machine $G_1$, $G_2$ . . . $G_n$, or by another suitable player tracking system as known in the art. Such a uniquely identified player may be able to enter an ongoing bonus game with attributes from an earlier entry, or otherwise continue earlier play of the ongoing bonus game. Players may also be enabled, or required, to act in a coordinated fashion, as a team, to collect bonus awards in an ongoing bonus game.

One example of an ongoing bonus game is a random selection type of game. In one possible embodiment of this game, a number of gaming machines $G_1$, $G_2$ . . . $G_n$ are networked to each other and to a bonus event computer 240, which is operatively connected to at least one bonus game display 236. It is preferred that there be at least fifty networked gaming machines $G_1$, $G_2$ . . . $G_n$ that offer a spinning reel-type game as a primary or base game. The ongoing bonus game may be entitled "Loads of Luck," play of which includes animation on at least one bonus game display 236 in the form of a forest scene including a number of leprechauns (for example, ten), each carrying bags of gold. In the foreground of the display is a gate, by which sits one additional bag of gold. The leprechauns represent ten options selectable during play of the ongoing bonus game.

When specific events occur in the base games on the gaming machines $G_1$, $G_2$ . . . $G_n$, the amount of bonus prize awards increases randomly within the selected options. For example, a player at a gaming machine $G_1$, $G_2$ . . . $G_n$ makes a wager and plays a base game to an outcome resulting in 3, 4, 5, or any selected number of gold coin characters appearing on the reels or on a video display 118 simulating reels. The gold coin characters may also be displayed on a display 120 or 122 for emphasis. At least some of the bonus prizes for the ongoing bonus game, as represented by the bags of gold, are then increased by an amount related to the number of gold coin characters displayed. The amount added is randomly distributed among the (for example, ten) selectable options and the distribution process is animated as the leprechauns on bonus game display 236 gather pieces of gold that fly onto the background scene and place them in bags. The amounts in the bags of gold of the various leprechauns may be displayed on the bonus game display 236 to attract player interest in the games in a manner that does not reveal which selectable option (leprechaun) is associated with which value (bag of gold). The leprechauns may periodically trade their bags of gold, which trade may also be animated by depicting the leprechauns exchanging bags.

When the predetermined activity enabling participation in the ongoing bonus game occurs on a gaming machine $G_1$, $G_2$ . . . $G_n$, the player at that machine $G_1$, $G_2$ . . . $G_n$ is allowed to select an option, which selection is displayed on a bonus game display 236 as selecting a leprechaun. The selection may be effected, for example, by the player touching a corresponding leprechaun symbol on a touch screen display on his or her gaming machine $G_1$, $G_2$ . . . Gn. The player is then awarded the value associated with the selected option as a bonus prize award. The award of the bonus prize is also animated in the form of the selected leprechaun bringing his bag to the gate and dumping the gold coins out. The amount of the bonus prize award may be indicated, for example, on bonus game display 236 as well as on a credit display on the player's gaming machine $G_1$, $G_2$ . . . $G_n$. The selectable option (leprechaun) presenting the bonus prize award subsequently returns to the forest after picking up the bag of gold by the gate, that bag having an associated bonus prize award value. The emptied bag is left by the gate to accumulate gold coins in the further course of ongoing bonus game play.

The foregoing example may also be implemented as a standalone bonus game, although implementation as a competitive game among players at a plurality of networked gaming machines $G_1$, $G_2$ . . . $G_n$ is currently preferred. It is believed that competition for the various bonus awards, which may be obtained more frequently over time through increased frequency and thus rate of play of the primary or base game, will stimulate greater interest on the part of players and thus generate a higher level of revenue for the casino or other game operator.

A second example of an ongoing bonus game is a combination of a role-playing game and a collection game. The game requires players to select a role, complete tasks and collect items associated with a bonus award value to receive a bonus award. An example of this game may be referred to as "Gold Quest." A large area is animated on a displays 118, 120 or 236, and preferably is a "western" scene, or another landscape scene. When specific events occur on gaming machines $G_1$, $G_2$ . . . $G_n$, bonus prize award units become available for collection within the ongoing bonus game. This may be animated as a number of gold units, which may be animated gold nuggets, appearing on the displays 118, 120 or 236 and then disappearing. The amount of bonus prize award units available at any time may be displayed.

A player at a gaming machine $G_1$, $G_2$ . . . $G_n$ is uniquely identified during the course of play on that gaming machine $G_1$, $G_2$ . . . $G_n$, allowing a series of actions to be taken on as participation in the ongoing bonus game is enabled or qualified. Preferably, a player may retain a unique identification in the manner discussed above to enable the player to leave the ongoing bonus game and subsequently return to the same or any other gaming machine $G_1$, $G_2$ . . . $G_n$ to continue play in the ongoing bonus game from the same point at which the player left the game. The uniquely identified player may even be enabled to continue play at a different casino C. The unique identifier may also be used to track player attributes, such as number of base games played as well as the number and amount of wagers made in the base game, in addition to other player attributes that may be useful for marketing casino or other services to that player.

In one exemplary embodiment of this game, a number of gaming machines $G_1$, $G_2$ . . . $G_n$ are networked to each other and to a bonus event computer 240. As the base game is played on the gaming machines $G_1$, $G_2$ . . . $G_n$, specific events occur at random and the available bonus awards are increased. The bonus awards are animated as gold nuggets residing in a number of mines. The mines are scattered all over an animated play field presented on a bonus game display 236, the play field being depicted on the display as extending beyond what the eye can see.

A player is qualified to participate in the ongoing bonus game when a predetermined activity randomly occurs on the gaming machine $G_1$, $G_2$ . . . $G_n$ the player is using. The player may be assigned (by, for example, occurrence of a given symbol on a reel display for the primary or base game), or select (the opportunity to select being attendant to being enabled to play in the ongoing bonus game), a role such as a scout, a miner, a transporter or another one of a plurality of predetermined roles selectable from a plurality of different roles. The ongoing bonus game may be configured to enable players to switch roles, or it may not. For example, a player may be enabled to select different roles in order to perform all the tasks associated with recovery of gold nuggets from a mine and participate alone in the ongoing bonus game. To encourage team play, role switching may not be permitted so that recovery of the gold requires participation in each role by at least one different player. In either instance, it is contemplated that the ongoing bonus game enable players to form teams to increase their ability to obtain bonus awards and compete with other player teams. The different roles may be assigned different tasks for play of the ongoing bonus game.

A player qualified to participate in the ongoing bonus game may, for example, select the role of scout. This player role performs the task of locating a mine containing bonus prize award units represented as animated gold nuggets. Each participation in the ongoing bonus game may allow the scout to make a certain number of moves, explore a certain area, or spend a preselected amount of time searching for a gold mine on the play field. Depending on the configuration of the ongoing bonus game, the location of a mine by a scout may allow the team to "claim" that mine, preventing other teams from collecting the gold nuggets therein and receiving the bonus prize awards associated with those bonus prize award units. Alternatively, the teams may compete to collect the gold nuggets found within a mine, or the first team to actually collect gold nuggets within a mine may then "claim" the mine.

A player selecting the role of miner may participate in the ongoing bonus game by becoming active at a mine after it has been located by a scout. The miner may be at least a second player on a team, allowing the player in the role of scout to continue to locate additional mines in subsequent moves and increase the ability of the team to earn bonus prizes. Each participation in the bonus game may allow the miner to perform the task by "mining," or collecting, a fixed number of bonus prize award units (gold nuggets) from a mine.

A player selecting the role of transporter may participate in the ongoing bonus game by becoming active after the player selecting the role of miner has collected or "mined" the bonus prize award units. As with the other roles, it is preferred that the role of transporter be selected by a different player on a team, although it may be an additional role selected by a single player. The transporter performs the task of moving the animated gold nuggets to an image of one or more banks represented on the animated display, allowing the players to collect the bonus prize amount associated with the collected bonus prize award units.

It will be appreciated that team play may be used to enable scouting, mining and transporting gold from more than one mine and at a faster rate that might be effected by a single player. In addition, frequent and continuous play by team members is encouraged by the display of other teams finding, mining and retrieving gold nuggets during periods of inactivity by one's own team.

Preferably, collection of the bonus prize during team play is accompanied by apportioning the bonus prize amount among the uniquely identified players on a team, using the online accounting and gaming information system 260. Apportioning may be effected by awarding the full amount of the bonus prize award units to each player on the team, by awarding an equal percentage or number of bonus prize award units to each player on the team, or by dividing up the bonus prize award units in inverse proportion to the number of moves put into earning the bonus prize award units by each player, or otherwise as may be desired. Players on a winning team not currently playing at a gaming machine $G_1$, $G_2$ . . . $G_n$ may collect their portion of bonus prize winnings when they next return to play the ongoing bonus game, at a bonus prize award terminal, or as otherwise enabled. Once all the bonus prize award units have been removed from a mine, it is deemed to be no longer active and the team which has depleted the gold reserves therein must locate a new mine to continue to obtain bonus prize award units. Closure of a mine may be signaled by an animated image of the mine collapsing.

It is contemplated that ongoing bonus game movements may be enabled roughly thirty-three percent of the time in the course of primary or base game play. That is, roughly one of every three reels spins of primary or base game play, on average, results in display of a symbol to enable play in the ongoing bonus game. It is, of course, further contemplated that there will be primary or base game payouts for bars, sevens, cherries, etc., as a conventional reel-type primary or base game currently pays.

Players on a team may be required to all be located at a single casino site C, or a single bank of gaming machines $G_1$, $G_2$ . . . $G_n$. Alternatively, with a multi-site system such as that depicted in drawing FIG. 3, players on a team may be located at different casino sites $C_1$, $C_2$ . . . $C_n$, which may be located anywhere, and still participate as a team. It will be appreciated that it is within the scope of the present invention to allow a personal computer connected to a network, including a local area network (LAN), a wide area network (WAN) or the Internet to function as a gaming machine $G_1$, $G_2$ . . . $G_n$ under appropriate circumstances. For example, where a secure or encrypted connection may be made to an online casino, over the Internet, and credits may be entered to play a base game using a credit card, a debit card or another recognized account, portions of the personal computer monitor may be respectively sequestered to display the ongoing bonus game and the base game of a gaming machine $G_1$, $G_2$ . . . $G_n$. As with a more traditional gaming machine embodiment, the player may be enabled to participate in the ongoing bonus game upon the occurrence of a predetermined activity. In such an embodiment, a player may even join in team play from his or her home.

The use of a team competition may encourage players to continue, extend, or return their play of the gaming machines $G_1$, $G_2$ . . . $G_n$. While teams may be formed at a casino $C_1$, $C_2$ . . . $C_n$ for the purpose of play over a limited period of time, an ongoing team may be made up of group of friends or family members who will encourage each other to return and continue play of the ongoing bonus game to collect (mine) and transport bonus prize award units that have already been located, or transport bonus prize award units that have already been collected (mined) but not transported, by other members of the team. On the other hand, teams may be built "on the fly" with strangers. Players may be enabled to signal the need for other team members in unfilled roles before entering the ongoing bonus game, after performing tasks which generate potential bonus prize award units for which assistance is required to secure, or otherwise according to the game configuration. In addition, it is contemplated that mere play of the base or primary game on a gaming machine $G_1$, $G_2$ . . . $G_n$ and generation of additional amounts to be added to the bonus prizes may not enable participation in any bonus prize award already being accumulated by, for example, other players acting as a team. To the contrary, in order to participate in the ongoing bonus game and bonus prize awards, a player must qualify into bonus game play by the occurrence of some predetermined activity associated with primary or base game play.

An additional element of difficulty may be incorporated in the game configuration, such as the collapse of a mine shaft portion between a scout or miner and the cache of gold nuggets, the transporter's mine car going out of control or the transporter being held up by bandits after exiting the mine, or otherwise. The difficulty may be overcome, for example, by diversion of player "moves" from their primary tasks, or by wagering additional sums in bonus game play in return for the potential of the bonus prize award sought to be recovered being greatly increased by random chance. If desired, this aspect of the ongoing bonus game may be used to present an opportunity for recovery of a "mother lode" in the form of a progressive jackpot or other greatly enhanced bonus prize award.

At the inception of an ongoing bonus game according to the present invention, the award pool for the bonus prize awards may be "seeded" with money fronted by the game operator, such as a casino. From that outset, however, the award pool should be self-sustaining with a portion of wagers placed for play of the primary game on one or more gaming machines enabling play of the ongoing bonus game. Alternatively, the award pool may be sustained by funds transferred from the primary game in response to occurrence of certain preselected outcomes thereof relating to the ongoing bonus game.

Further, and as enabled by player tracking, it is contemplated that specific states, roles or other status associated with play of the ongoing bonus game may continue to be associated with a player during periods where he or she is not participating in the ongoing bonus game. Therefore, upon reentry to the ongoing bonus game, a player may continue play in a previously established role, or in a previously earned status, either individually or as part of a team.

In addition, while entry into the ongoing bonus game of the present invention has been described herein as requiring a qualification responsive to some activity or event, such qualification may comprise mere play of a primary game so that substantially every play or round of a primary or base game enables entry to and participation in the ongoing bonus game.

It will be appreciated that modifications to the above exemplary embodiments or other, equally suitable ongoing bonus games may be created by those of ordinary skill in the art. All such ongoing bonus game modifications and other ongoing bonus games and machines, systems and methods for implementing same fall within the scope of the present invention. It will be further appreciated that any method, system or device for providing an ongoing bonus game in connection with a gaming machine may fall within the scope of the present invention.

Accordingly, the present invention includes conducting a game of chance, comprising placing a wager with a first gaming unit configured to generate a series of random outcomes during play of a primary or base game and qualifying to participate in an ongoing bonus game based upon a predetermined activity associated with play of the primary or base game on the first gaming unit. It is preferred that the ongoing bonus game be displayed on a display, which may be associated with the gaming machine or in communication with a gaming system to which the gaming machine is networked. Participation in the ongoing bonus game may be enhanced by continuing play of the primary or base game; this is particularly useful where a uniquely identified player is enabled to reenter the ongoing bonus game and continue an earlier participation therein. The ongoing bonus game may be a selection game, a collection game, a role-playing game, or any other suitable game. A role-playing game preferably includes a number of roles from which a player selects a role, and requires cooperation between players as a team to receive a bonus prize award. The players may be assembled on competitive teams. The bonus prize awarded to a team may be awarded to each player on that team, or may be apportioned between those players. The predetermined activity for participation in the ongoing bonus game may be achieving a predetermined random outcome, making a certain value of wager, making a certain number of wagers, or completing another activity associated with play of the primary or base game on the gaming machine.

The present invention further includes providing a perpetual competitive bonus game over linked gaming machines, including providing a bonus event computer configured to run at least one ongoing bonus game thereon and networking at least one gaming machine configured to generate a series of random outcomes in play of a primary or base game in operative communication with the bonus event computer. Participation in the at least one ongoing bonus game is dependent upon occurrence of a predetermined activity associated with play of the primary or base game on the at least one gaming machine. It is preferred that a plurality of gaming machines be networked with the bonus event computer in communication therewith. The gaming units may be networked to at least one bonus game display to exhibit the at least one ongoing bonus game and may be configured to simultaneously exhibit the at least ongoing bonus game thereon. Where a plurality of gaming machines is employed, some gaming machines may be situated at two or more mutually remotely located casino sites. The operative connections between components may be made over a LAN, a WAN, or the Internet.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A method of playing a game, the method comprising:

receiving a wager from a player displaying an image associated with a primary game;

determining a game outcome associated with the primary game;

determining if a qualifying activity has occurred during the primary game;

altering an image associated with a bonus game independent of an input from the player until a qualifying activity is determined to have occurred;

altering the image associated with the bonus game according to an input from the player independent of the game outcome of the primary game if the qualifying activity is determined to have occurred;

receiving a termination input; and altering the image associated with the bonus game independent of an input from the player after the termination input is received until a qualifying activity is determined to have occurred again.

2. The method according to claim 1, comprising:

associating at least one interactive graphical character with the player; and altering the image associated with the bonus game in response to interaction between the image and the graphical character associated with the player according to the input from the player independent of the game outcome of the primary game.

3. The method according to claim 1, comprising storing a change in status of the graphical character associated with the player according to the alteration of the image associated with the bonus game in response to interaction between the image and the graphical character associated with the player according to the input from the player independent of the game outcome of the primary game.

4. The method according to claim 1, comprising:

receiving inputs from a plurality of players other than the player;

altering the image associated with the bonus game according to the inputs from the plurality of players other than the player and independent of an input from the player until the qualifying activity is determined to have occurred;

altering the image associated with the bonus game according to the inputs from the plurality of players other than the player and the input from the player independent of the game outcome of the primary game if the qualifying activity is determined to have occurred; and altering the image associated with the bonus game according to the inputs from the plurality of players other than the player and independent of an input from the player after the termination input is received until a qualifying activity is determined to have occurred again.

5. The method according to claim 1, comprising:

associating at least one interactive graphical character with each of the players of the plurality of players other than the player and with the player; and altering the image associated with the bonus game in response to interaction between the image, the interactive graphical characters associated with each of the players of the plurality of players other than the player according to the inputs from the plurality of players other than the player and the graphical character associated with the player according to the input from the player independent of the game outcome of the primary game.

6. The method according to claim 5, wherein the interaction between the image associated with the bonus game is different for at least one of the at least one interactive graphical characters associated with each of the players of the plurality of players other than the player and the at least one interactive graphical character associated with the player.

7. The method according to claim 6, wherein the at least one of the at least one interactive graphical characters associated with each of the players of the plurality of players other than the player has a different role than the at least one interactive graphical character associated with the player.

8. The method according to claim 6, comprising storing a change in status of the graphical character associated with the player according to the alteration of the image associated with the bonus game in response to interaction between the image, the interactive graphical characters associated with each of the players of the plurality of players other than the player according to the inputs from the plurality of players other than the player and the graphical character associated with the player according to the input from the player independent of the game outcome of the primary game.

* * * * *

UNITED STATES PATENT AND TRADEMARK OFFICE
CERTIFICATE OF CORRECTION

PATENT NO. : 6,780,111 B2
DATED : August 24, 2004
INVENTOR(S) : Lee E. Cannon et al.

It is certified that error appears in the above-identified patent and that said Letters Patent is hereby corrected as shown below:

Title page,
Item [75], Inventors, cancel "Boxeman" and insert -- Bozeman --.

Signed and Sealed this

Eleventh Day of January, 2005

JON W. DUDAS
*Director of the United States Patent and Trademark Office*